(12) United States Patent
Johnson

(10) Patent No.: US 7,171,941 B2
(45) Date of Patent: Feb. 6, 2007

(54) POSITIVE DISPLACEMENT ROTARY DEVICE AND METHOD OF USE

(76) Inventor: Steve Johnson, 3950 SE. Harrison, Portland, OR (US) 97214

( * ) Notice: Subject to any disclaimer, the term of this patent is extended or adjusted under 35 U.S.C. 154(b) by 0 days.

(21) Appl. No.: 11/048,361

(22) Filed: Jan. 31, 2005

(65) Prior Publication Data
US 2005/0166889 A1 Aug. 4, 2005

(51) Int. Cl.
F02B 53/04 (2006.01)
F02B 53/00 (2006.01)
F01C 1/08 (2006.01)
F01C 19/00 (2006.01)
F03C 2/00 (2006.01)
F01C 1/24 (2006.01)

(52) U.S. Cl. ............... 123/238; 123/249; 123/221; 418/195; 418/226; 418/148

(58) Field of Classification Search ........... 123/221, 123/235, 238, 249; 418/195, 198, 207, 148, 418/226
See application file for complete search history.

(56) References Cited

U.S. PATENT DOCUMENTS

| | | | | | |
|---|---|---|---|---|---|
| 1,304,497 | A | * | 5/1919 | Maxam | 418/226 |
| 2,090,280 | A | * | 8/1937 | Biermann | 418/218 |
| 2,091,577 | A | * | 8/1937 | Adler et al. | 123/238 |
| 2,994,276 | A | * | 8/1961 | Matson | 418/195 |
| 3,182,600 | A | * | 5/1965 | Guinard | 418/195 |
| 3,205,873 | A | * | 9/1965 | Renshaw | 418/195 |
| 3,205,874 | A | * | 9/1965 | Renshaw | 418/195 |
| 3,221,717 | A | * | 12/1965 | Renshaw | 123/238 |
| 3,232,041 | A | * | 2/1966 | Renshaw | 123/249 |
| 3,277,832 | A | * | 10/1966 | Panie-Dujac | 418/195 |
| 3,862,623 | A | * | 1/1975 | Ehlert | 123/235 |
| 3,897,756 | A | * | 8/1975 | Upchurch | 123/238 |
| 4,401,070 | A | | 8/1983 | McCann | 123/229 |
| 5,429,084 | A | | 7/1995 | Cherry et al. | 123/243 |
| 5,509,793 | A | | 4/1996 | Cherry et al. | 418/219 |
| 5,551,853 | A | | 9/1996 | Cherry et al. | 418/148 |
| 6,588,395 | B2 | * | 7/2003 | DeFazio | 123/221 |
| 7,059,294 | B2 | * | 6/2006 | Wright | 123/233 |
| 2004/0005235 | A1 | * | 1/2004 | Didin | 418/195 |

FOREIGN PATENT DOCUMENTS

FR 1 259 874 * 6/1960
JP 63227901 A * 9/1988

* cited by examiner

*Primary Examiner*—Thai-Ba Trieu
(74) *Attorney, Agent, or Firm*—Marger Johnson & McCollom, P.C.

(57) ABSTRACT

A positive displacement rotary device and method of use are provided. The rotary device includes coupled chamber halves with a drive disc having at least one drive plate rotatably engaged with the drive disc. The drive disc is mounted on a drive shaft and positioned between the coupled chamber halves. The drive plates include at least two drive lobes with the drive plates rotating about an axis of rotation 90° and tangent to the drive shaft axis of rotation while the drive disc sweeps the drive plates around the drive shaft. The chamber halves include camming chambers that are shaped to follow the path of the drive lobes on the drive plates as they are swept around the drive shaft. The rotary device can be used as a motor, a pump, or even an internal combustion engine.

19 Claims, 14 Drawing Sheets

BALL BEARING DRIVE PLATE

POSITIVE DISPLACEMENT ROTARY DEVICE AND METHOD OF USE

FIELD OF THE INVENTION

The present invention relates generally to rotary pumps, motors and engines.

BACKGROUND OF THE INVENTION

Positive displacement rotary devices efficiently replace pistons in such uses as pumps, motors and engines. Probably the best known application is the Wankel rotary engine which was produced for Mazda automobiles. A more recent example can be found in U.S. Pat. No. 4,401,070, to McCann, which discloses a sliding vane rotary engine. And even more recently, a more general axial vane rotary device was disclosed in U.S. Pat. No. 5,429,084 (to Cherry et al.), U.S. Pat. No. 5,509,793 (to Cherry et al.), and U.S. Pat. No. 5,551,853 (to Cherry et al.).

The McCann and Cherry patents all describe rotary devices that employ oscillating axial vanes located on a rotor. Cammed surfaces or cause the axial vanes to oscillate and in conjunction with the axial vanes define increasing/decreasing volumetric spaces.

The axial vane rotary device provides an efficient replacement to piston devices by providing a positive displacement of volume. The emergence of an axial vane into a chamber on one side of a rotor corresponds to the reference piston position of Top Dead Center. The axial vane traveling around and down corresponds to a piston traveling downward in a cylinder by increasing the volume in the chamber behind the sweep of the vane. The axial vane traveling around and up and withdrawing into the rotor corresponds to a piston position of Bottom Dead Center reaching a maximum volume. The next axial vane emerging from the rotor then acts like a piston traveling upward in a cylinder to complete a compression stroke decreasing the volume as the vane sweeps around.

An advantage of rotary devices like the axial vane devices disclosed by McCann and Cherry is the lack of a return piston stroke. Without the need to reverse piston direction, this arrangement allows the axial vanes to be acted upon by pneumatic or hydraulic pressure in one continuous direction.

It is also apparent, however, that the same axial vane arrangement allows for completely reversing the operation. Reversing the shaft rotation merely changes the direction of flow through the device.

While the description above references using the axial vane device as a pump, the drive shaft of the device can also be controllable by forcing fluid flow through the device turning the axial vane device into a motor.

These axial vane devices, however, vary the resulting torque only by varying the volumes of the chambers through vertical camming. Because the chambers in the axial vane device have a constant axial width, this arrangement does not take advantage of varying the torque by varying the moment arm (i.e., varying the axial distance of the applied pressure). The axial vane devices also continue to include parts that experience reversing motions because the axial vanes oscillate up and down within the device. Further, the axial vane devices result in sharp, rectangular corners making it more difficult to seal the vanes and chambers.

BRIEF DESCRPTION OF THE DRAWINGS

DETAILED DESCRIPTION

Figure 1:
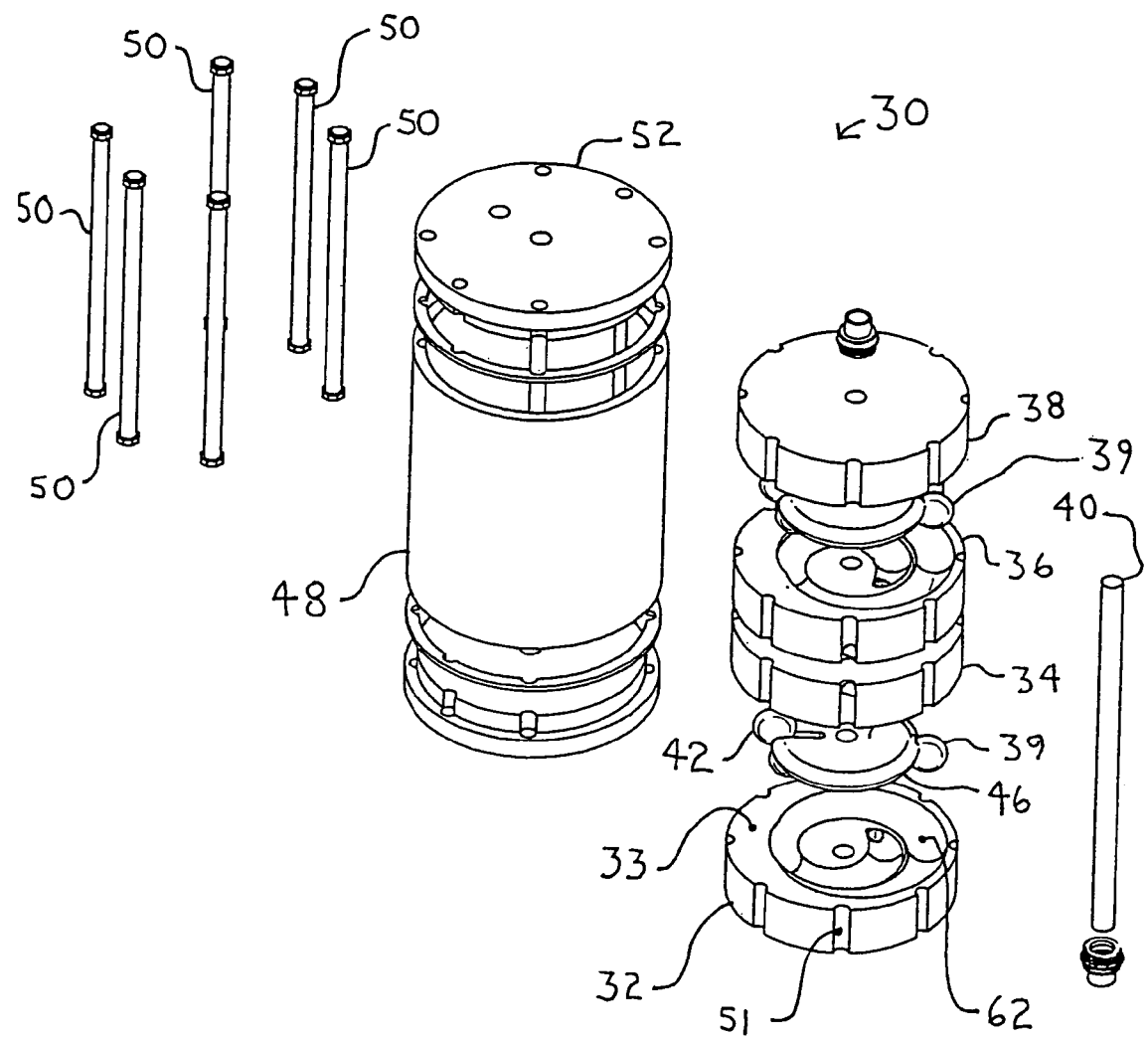
FIG. 1 is an exploded perspective view of a positive displacement rotary device according to an embodiment of the invention.

FIG. 1 shows an exploded perspective view of positive displacement rotary device 30 that utilizes two pairs of chamber halves 32, 34 and 36, 38. Looking at the lower pair of chamber halves 32, 34, the chamber face 33 of lower chamber half 32 and camming chamber 62 are shown. The details of camming chamber 62 will be described below. Drive disc 46 is shown positioned between the chamber halves 32, 34 with two drive plates 39 and 42 shown assembled in the drive disc 46.

Assembled, drive shaft 40 extends through the chamber halves 32, 34 (and chamber halves 36, 38) and has a longitudinal axis of rotation. Also when assembled, the chamber halves 32, 34 are coupled together and the chamber face 33 of each chamber half 32, 34 form a seal against the drive disc 46 and drive plates 39 and 42.

Housing 48 surrounds the coupled chamber halves 32, 34 and 36, 38 with the drive shaft 40 extending longitudinally through end plates 52. In the embodiment shown in FIG. 1, bolts 50 clamp the end plates 52 onto housing 48 and secure the chamber halves 32, 34 and 36, 38 by fitting in grooves 51.

Figure 2C:
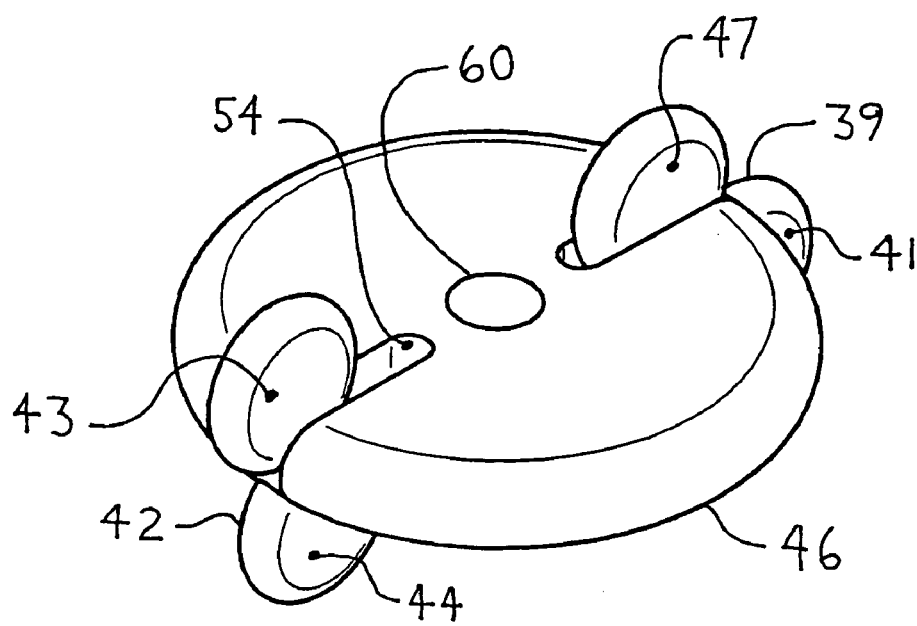
FIG. 2C is a perspective view of an assembly of the drive disc of FIG. 2A and the drive plate of FIG. 2B.
Figure 2A:
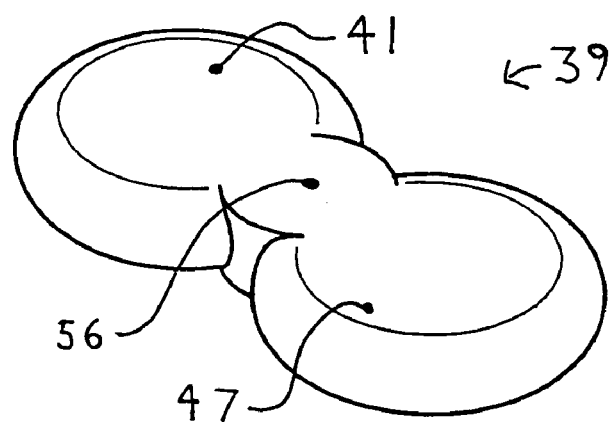
FIG. 2A is a perspective view of a drive disc used in the rotary device of FIG. 1.
Figure 2B:
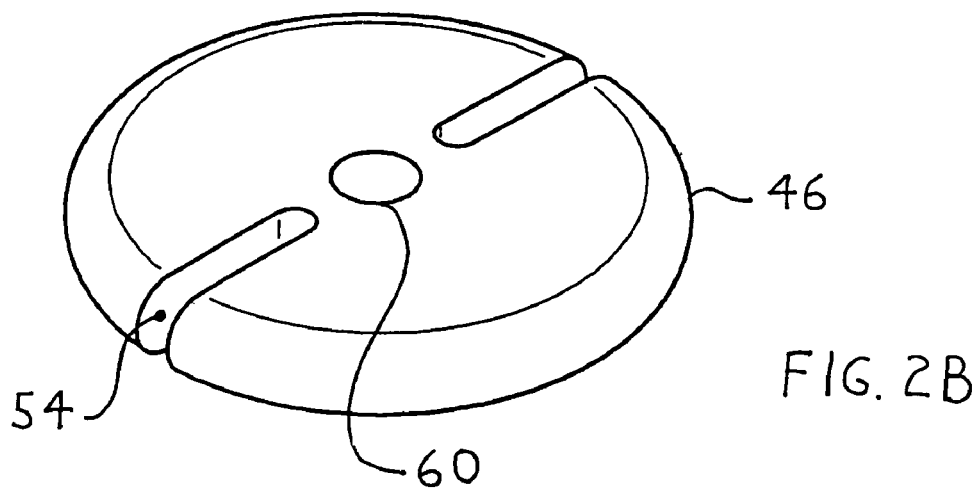
FIG. 2B is a perspective view of a drive plate used in the rotary device of FIG. 1.

FIGS. 2A–2C depict the drive disc 46 and drive plates 39 and 42. FIG. 2A shows a perspective view of a drive plate 39. Drive plate 39 has two circularly shaped drive lobes 41 and 47 and a central axis of rotation 56 positioned halfway between the centers of the circular drive lobes 41 and 47. Drive lobes 41, 47 are shown to be circular and drive plate 39 is shown to be symmetrical in shape which results in balanced pressures within the rotary device. Other shapes of drive lobes and drive plates, however, are anticipated with those shapes producing differences in pressure amounts and balances. Also, two drive lobes 41 and 47 are shown in this embodiment. As will be explained below, three or four drive lobes can be useful in applications such as internal combustion engines.

FIG. 2B shows a perspective view of drive disc 46. Drive disc 46 is circular and disc-shaped with two axial slots 54 and drive shaft engagement hole 60. In this embodiment, two axial slots 54 are symmetrically arranged on the drive disc 46 for mounting two drive plates 39 and 42. One axial slot 54, and thus one drive plate 39, is anticipated for use in other embodiments. Three or more axial slots 54 and a corresponding number of drive plates are also anticipated.

FIG. 2C shows a perspective view of drive plates 39 and 42 rotatably engaged in the axial slots 54 of drive disc 46. Here, the drive plates 39 and 42 are arranged to allow the drive lobes 41, 47, 43, and 44 to rotate beyond the edge of the drive disc 46. The drive plates 39, 42 are arranged in the drive disc 46 such that the axis of rotation of the drive plates are 90° to the axis of rotation of the drive disc 46 and tangential to the drive disc axis of rotation. As the drive disc 46 is rotated by drive shaft 40 (shown in FIG. 1), drive plates 39, 42 also rotate about their own axis of rotation 56.

Figure 3:
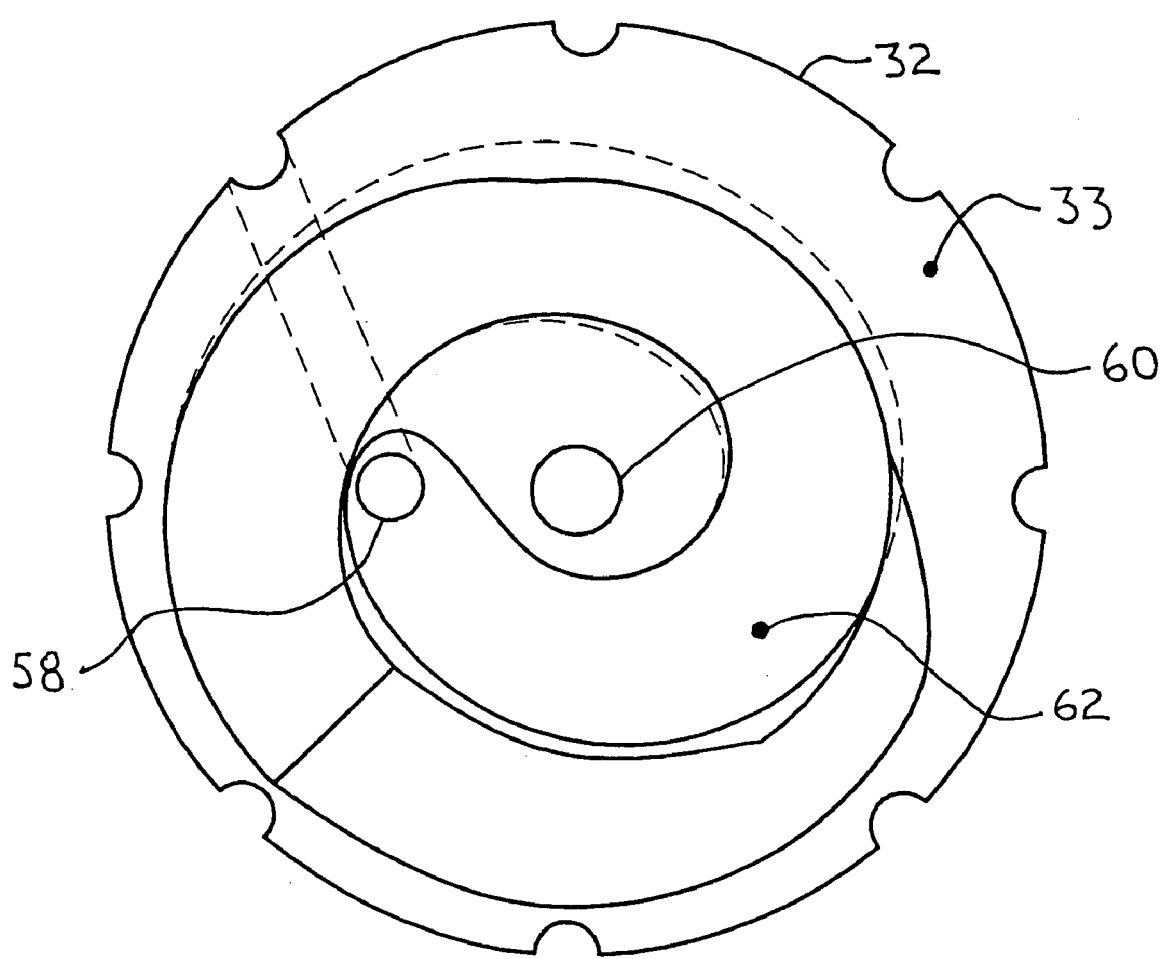
FIG. 3 is a top plan view and side elevation view of a chamber half used in the rotary device of FIG. 1.
Figure 3:
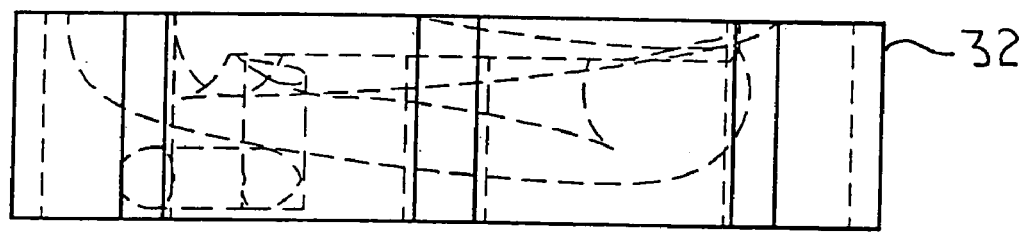

FIG. 3 is a top plan view and side elevation view of lower chamber half 32. The top plan view shows chamber face 33 which seals against the drive disc 46, drive plates 39 and 42 and opposing chamber half 34 (all shown in FIG. 1). The chamber face 33 includes a relieved area that forms the camming chamber 62 which is shown in hidden lines in the side elevation view of FIG. 3. Drive shaft 40 (shown in FIG. 1) extends through hole 60, with the center of hole 60 being the drive shaft axis of rotation.

Figure 4:
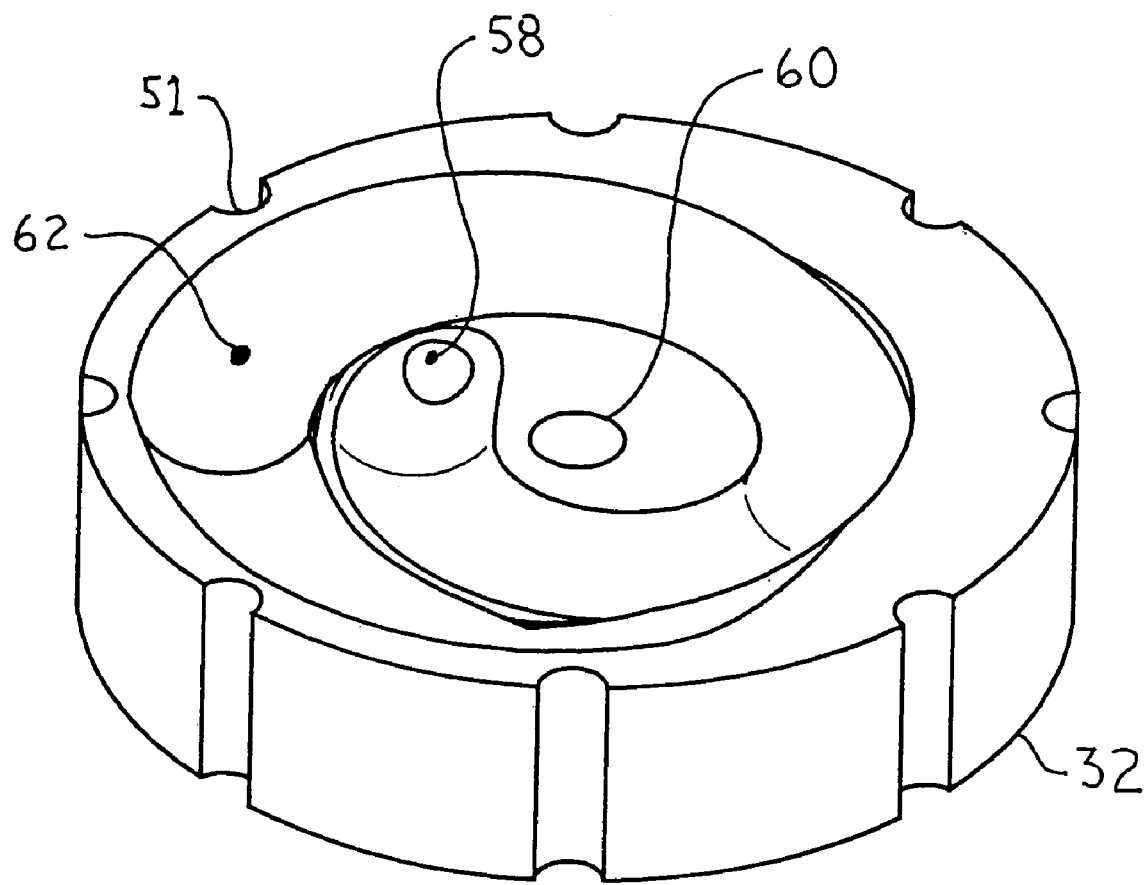
FIG. 4 is a perspective view of the chamber half of FIG. 3.

FIG. 4 shows a perspective view of lower chamber half 32. The shape of the camming chamber 62 is defined by the drive disc 46 and the path swept by the drive lobes 41, 47, 43, and 44 (see FIGS. 2A–2C) as the drive disc 46 rotates around the axis of rotation of the drive shaft 40 (shown in FIG. 1) and the drive plates 39, 42 rotate around their own axis of rotation 56. In the axial direction, the camming chamber 62 has a substantially spiral shape. Following from the center portion of the chamber face 33 spiraling outward to the circumference of the chamber face 33, the depth of the camming chamber starts out at a shallow depth, increases in depth, and then decreases in depth back to a shallow depth.

Inlet/outlet port 58 connects the camming chamber 62 to an external surface of the lower chamber half 32. In the embodiment shown, the inlet/outlet port 58 allows for fluid communication between the camming chamber 62 and one of the external grooves 51 of the chamber half 32.

FIGS. 5–9 show rotary device 70 at various drive disc and drive plate positions. In operation, the drive disc 46 is rotated by drive shaft 40 (shown in FIG. 1), with the chamber halves 32, 34 remaining stationary. For illustration purposes, the chamber halves 32, 34 are rotated in the top plan views of FIGS. 5A–9A to more easily show drive disc 46 and drive plates 39, 42 at the various angular positions.

Figure 5B:
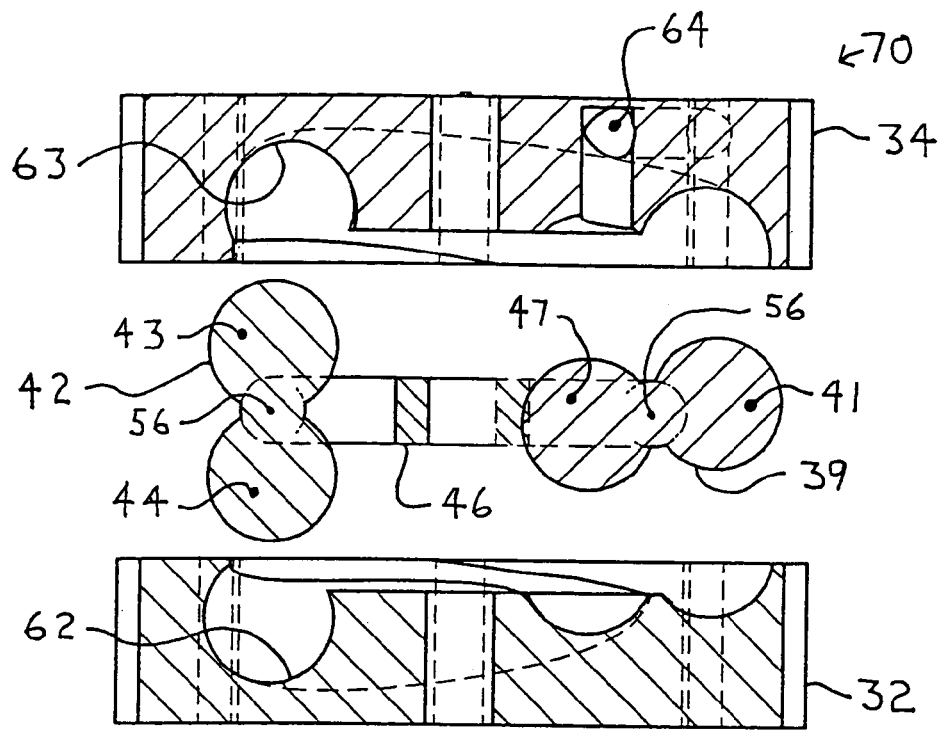
FIG. 5B is an exploded cross-sectional view of the rotary device of FIG. 5A taken along line A—A of FIG A.
Figure 5A:
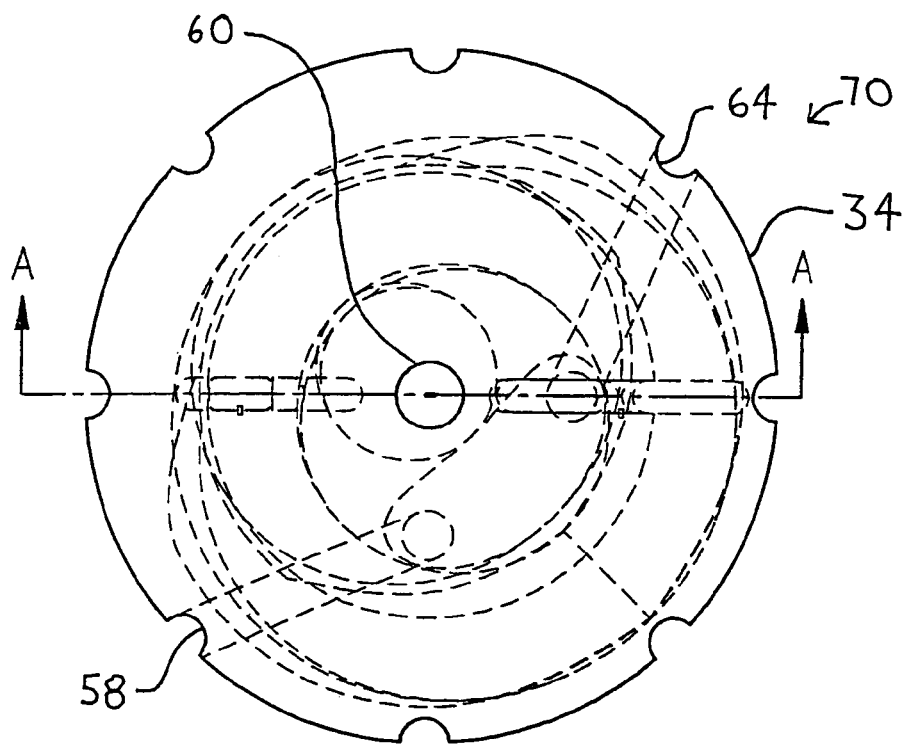
FIG. 5A is a top plan view of a positive displacement rotary device according to another embodiment of the invention showing the drive disc and drive plates at a reference starting angle.

FIG. 5A shows a top plan view of rotary device 70 showing the drive disc 46 and drive plates 39 and 42 at a zero angle reference point. FIG. 5B shows an exploded cross-sectional view of the rotary device 70 taken along line A—A of FIG. 5A. Upper chamber half 34 employs a camming chamber 63 similar to camming chamber 62 and includes an inlet/outlet 64 in fluid communication between the camming chamber 62 and an external groove 51 of the upper chamber half 34.

In FIG. 5B, the drive plate 42 on the left side is shown with drive lobes 44 and 43 in a mostly vertical position. The camming chambers 62, 63 of the chamber halves 32, 34 are shaped to receive the drive lobes 44 and 43. As shown in FIG. 4, the camming chambers 62, 63 smoothly follow the path of the moving drive lobes. By shaping the camming chambers 62, 63 in this manner, the camming chambers 62, 63 force the drive plates 39 and 42 to rotate around their own axis of rotation 56 (shown in FIG. 2A) while the drive plates 39 and 42 are swept around the drive shaft axis of rotation by the drive disc 46. FIG. 5B also shows the left drive lobe 47 of the right drive plate 39 emerging into the camming chamber 62 of the lower chamber half 34.

The drive plates 39 and 42 preferably include a seal (not shown) formed around the outer edge of the drive plate conforming to the shape of the drive lobes. When the rotary device 70 has fluid flowing in only a single direction through the device, the seal can be limited to sealing fluid flow in that direction without needing to seal for the reverse direction of fluid flow.

The device 70, however, can be operated in either direction of fluid flow if needed. In the case of reversible fluid flow, the seal would accommodate the reversal of sweep and rotational directions of the drive plates 39 and 42.

Figure 6B:
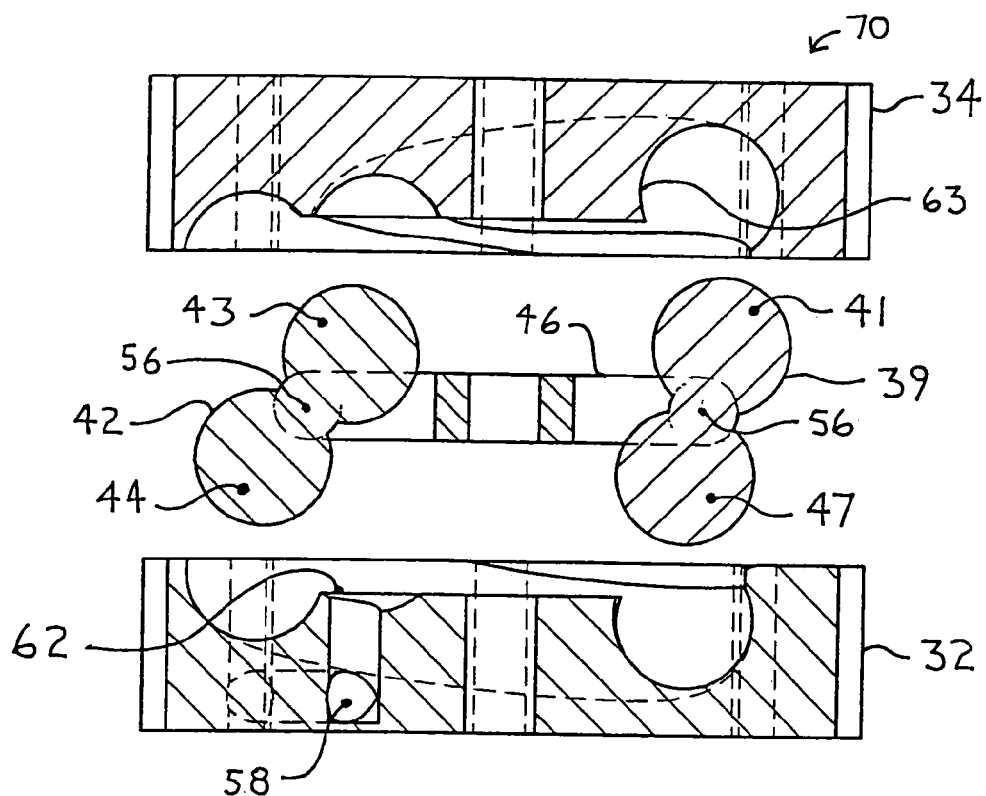
FIG. 6B is an exploded cross-sectional view of the rotary device of FIG. 6A taken along line A—A of FIG. 6A.
Figure 6A:
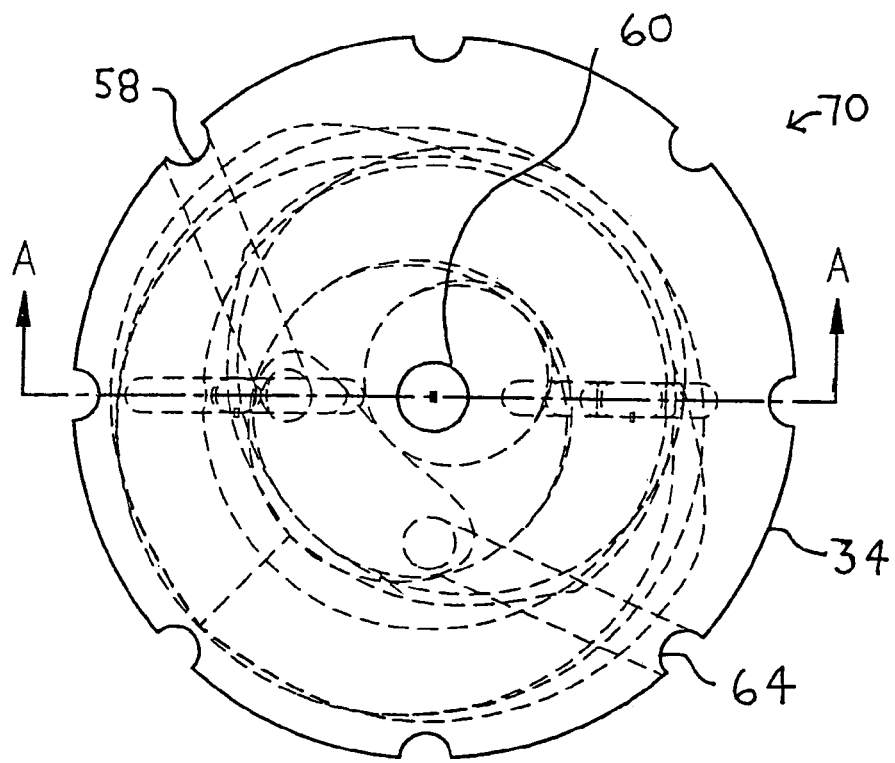
FIG. 6A is a top plan view of the rotary device of FIG. 5 with the drive disc and drive plates rotated inside the rotary device approximately 90° from the reference position.

FIG. 6A shows a top plan view of the rotary device 70 with the drive disc 46 and drive plates 39 and 42 rotated about 90° from the reference position shown in FIG. 5A. FIG. 6A shows an exploded cross-sectional view of the rotary device 70 taken along line A—A in FIG. 6A.

FIG. 6B shows the drive lobe 47 rotated about the axis of rotation 56 of drive plate 39 such that the drive lobe 47 extends farther into the chamber half 32. When the rotary device 70 acts as a pump, the movement of drive lobe 47 from its position in FIG. 5B to its position in FIG. 6B draws a fluid into the camming chamber 62 from inlet/outlet port 58. When the rotary device 70 acts as a motor, fluid forced into the camming chamber 62 through inlet/outlet port 58 forces the drive lobe 47 to move from its position shown in FIG. 5B to its position shown in FIG. 6B.

Figure 7B:
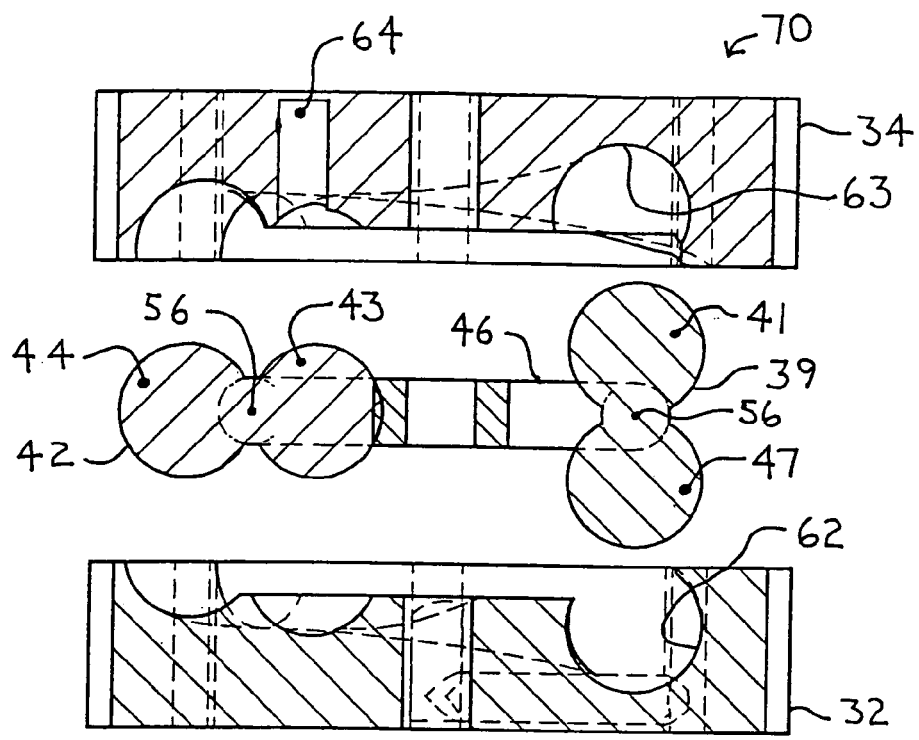
FIG. 7B is an exploded cross-sectional view of the rotary device of FIG. 7A taken along line A—A of FIG. 7A.
Figure 7A:
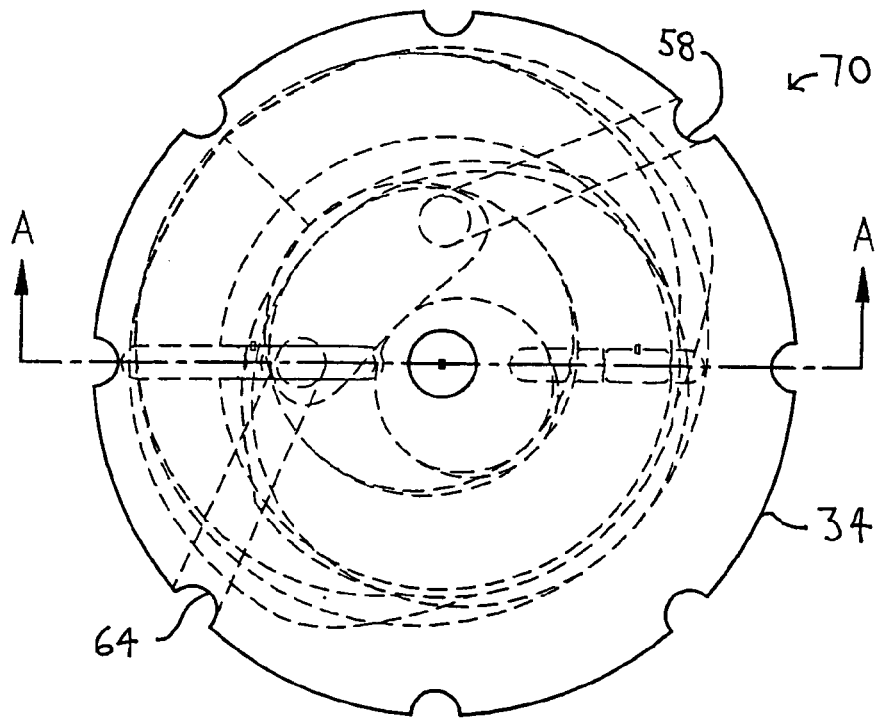
FIG. 7A is a top plan view of the rotary device of FIG. 5 with the drive disc and drive plates rotated inside the rotary device approximately 180° from the reference position.

FIG. 7A shows a top plan view of the rotary device 70 with the drive disc 46 and drive plates 39 and 42 rotated about 180° from the reference position shown in FIG. 5A. FIG. 7B shows an exploded cross-sectional view of the rotary device 70 taken along line A—A in FIG. 7A.

FIG. 7B shows the right drive plate 39 in a nearly vertical position, the deepest position of the drive lobes 47 and 41 into the respective chamber halves 32 and 34. The left drive plate 42 has drive lobe 43 emerging into the camming chamber 62 of chamber half 32 at the inner beginning of the spiral shape above inlet/outlet port 58, and thus beginning a next sweep of the camming chamber 62 by the drive lobe 43; the position of drive lobe 43 in FIG. 7B is the same position that drive lobe 47 occupied in FIGS. 5A–B.

Figure 8B:
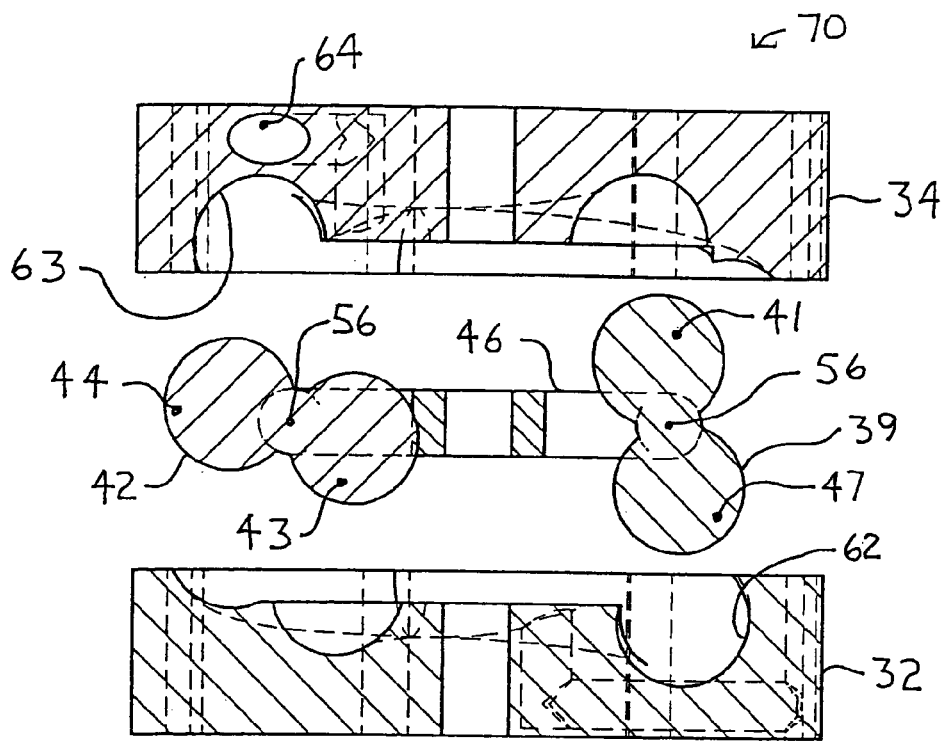
FIG. 8B is an exploded cross-sectional view of the rotary device of FIG. 8A taken along line A—A of FIG. 8A.
Figure 8A:
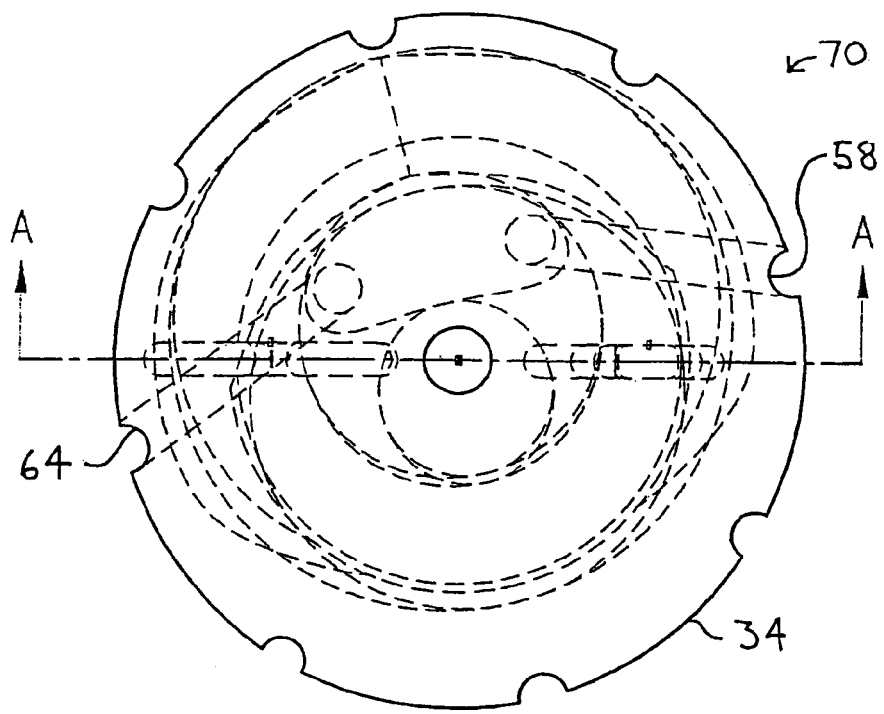
FIG. 8A is a top plan view of the rotary device of FIG. 5 with the drive disc and drive plates rotated inside the rotary device approximately 270° from the reference position.
Figure 9B:
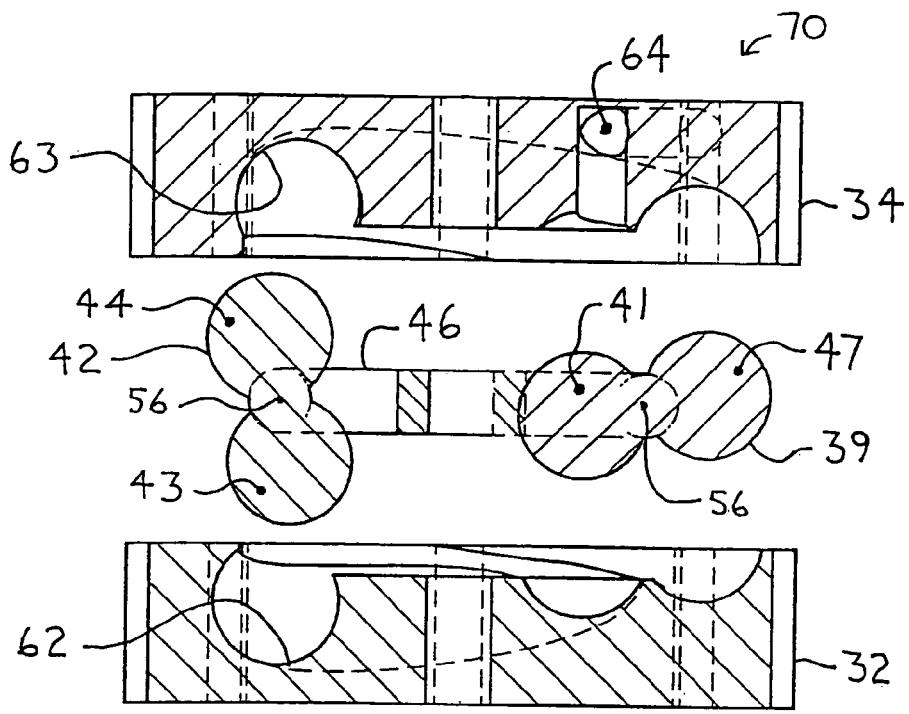
FIG. 9B is an exploded cross-sectional view of the rotary device of FIG. 9A taken along line A—A of FIG. 9A.
Figure 9A:
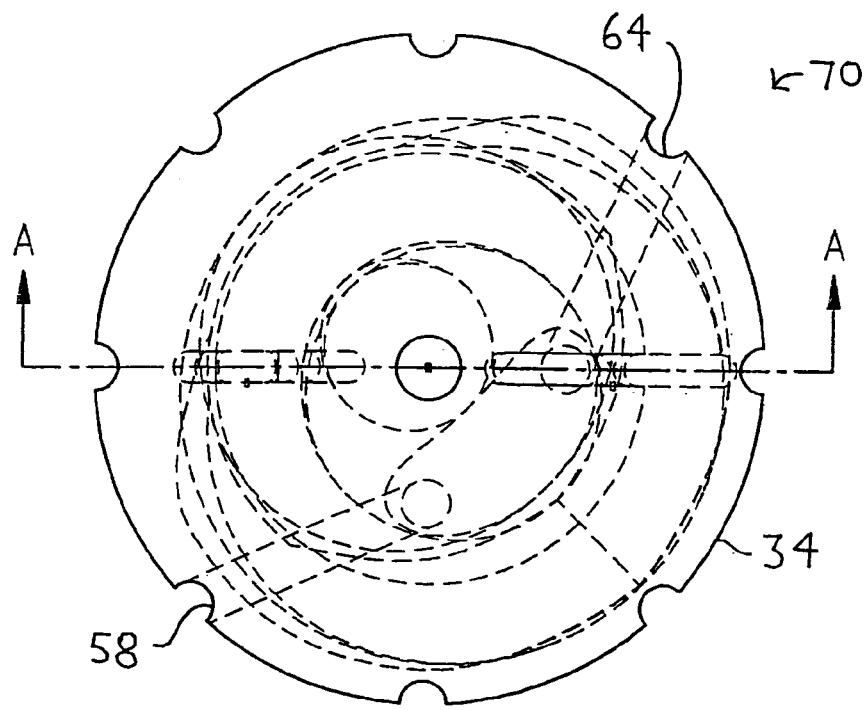
FIG. 9A is a top plan view of the rotary device of FIG. 5 with the drive disc and drive plates rotated inside the rotary device just less than 360° from the reference position.

FIG. 8A shows a top plan view of the rotary device 70 with the drive disc 46 and drive plates 39 and 42 rotated about 270° from the reference position shown in FIG. 5A. FIG. 8B shows an exploded cross-sectional view of the rotary device 70 taken along line A—A of FIG. 8A.

FIG. 8B shows the drive plates 39 and 42 continuing to rotate about their own axis of rotation 56 as the drive disc 46 continues to rotate within the device 70. Drive lobe 43 on the left drive plate 42 is shown finishing the sweep through the camming chamber 62 of the lower chamber half 32.

The rotary device 70 shown in FIGS. 5–9 is configured to rotate the drive plates 39 and 42 twice around the drive plate axis of rotation 56 for every single rotation of drive disc 46 around the drive shaft axis of rotation. This translates into a 2:1 ratio between drive plate 39 and 42 rotation and drive disc 46 rotation. Other configurations are contemplated including specifically a 1:1 rotation ratio.

Figure 10:
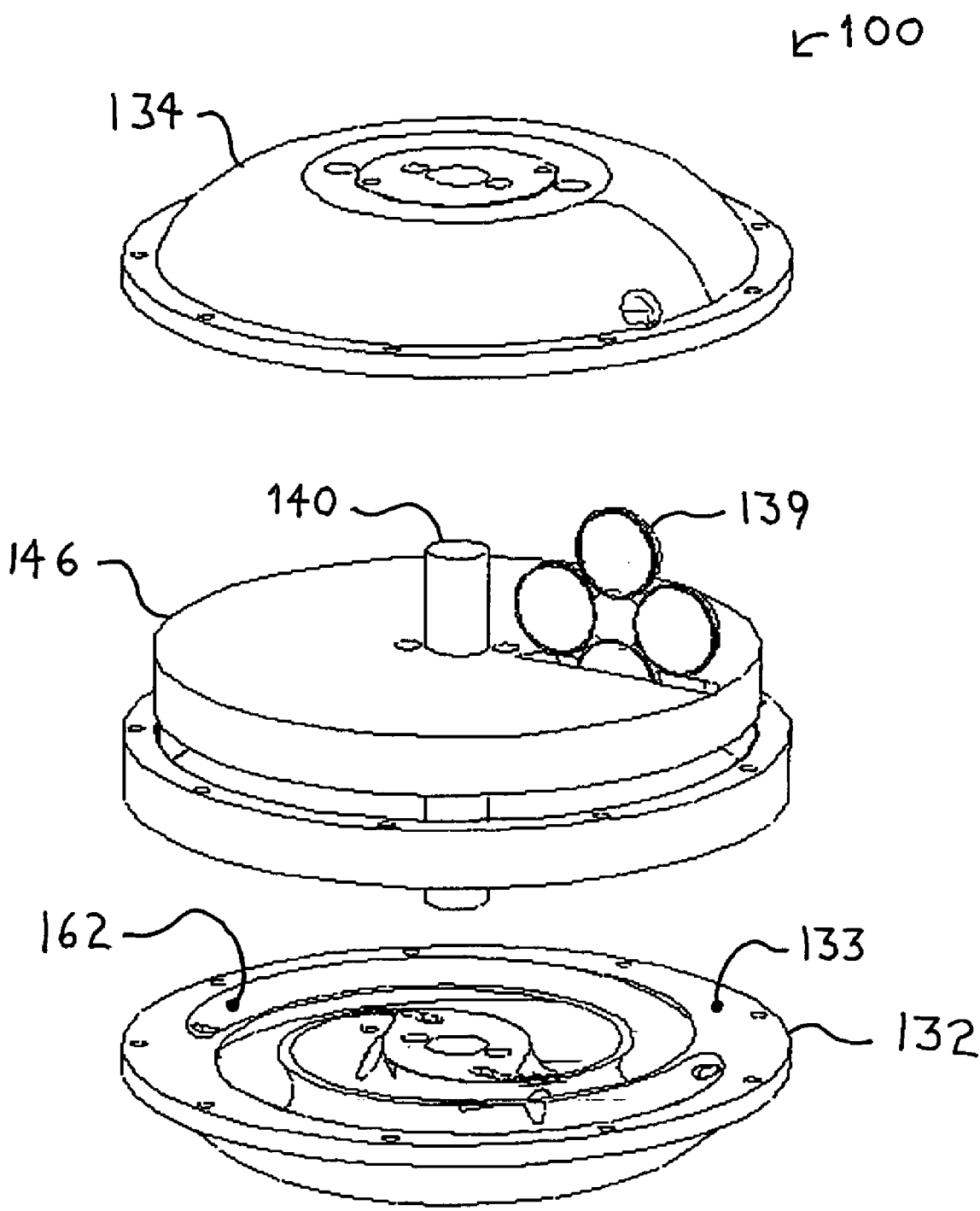
FIG. 10 is an exploded perspective view of a positive displacement rotary internal combustion engine according to another embodiment of the invention.

FIG. 10 is an exploded perspective view of a positive displacement rotary internal combustion engine 100 according to another embodiment of the invention. Rotary engine 100 includes lower chamber half 132, upper chamber half 134, drive shaft 140, drive disc 146 and drive plate 139.

Similar to the rotary devices described above, the drive plates 139 and 142 are rotatably engaged with drive disc 146 such that the drive plate 139 rotates about its own axis of rotation while drive disc 146 sweeps the drive plate 139 around the axis of rotation of the drive shaft 140. On the rotary engine 100, the drive plate 139 has four drive lobes.

FIG. 10 shows the camming chamber 162 in chamber face 133 of lower chamber half 132. The camming chamber 162 is shaped similar to the camming chambers 62, 63 in the rotary devices described above with a substantially spiral shape to follow the sweep of the multiple drive lobes on the drive plates 139.

The rotary engine 100 more efficiently completes the necessary portions of a four-stroke combustion cycle as the drive plate 139 sweeps through the camming chambers 162, 163 in the chamber halves 132, 134. In one embodiment, the camming chamber 162 in the lower chamber half 132 completes the intake and compression portions of the combustion cycle. The sweeping motion of a first drive lobe creates negative pressure behind the drive lobe which causes a mixture of air and fuel to enter the camming chamber. The next drive lobe sweeping through the camming chamber compresses the air/fuel mixture as the depth of the camming chamber 162 decreases forcing that drive lobe toward the drive disc 146, thereby decreasing the volume occupied by the air/fuel mixture. In this embodiment, the compressed mixture would be ported through a check valve (not shown) located in the drive disc 146 into the camming chamber 163 of the upper chamber half 134. Through the nature of the sweeping drive lobes and the shape of the camming chamber 163, the volume occupied by the compressed air/fuel mixture in the upper chamber half 134 would be similar or the same as it occupied in the lower chamber half 132 upon completion of compression.

With a combustion drive lobe positioned just past the intake port, the compressed fuel air is admitted into the camming chamber 163 behind the drive lobe. The ignition and exhaust portions of the combustion cycle would then take place in the camming chamber 163 of the upper chamber half 134. An ignition device such as a spark plug located in either the drive disc 146 or the upper chamber half 134 ignites the air/fuel mixture providing pressure against a first drive lobe in the camming chamber 163. A next drive lobe entering the camming chamber 163 then completes another separate combustion event and clears the camming chamber 163 ahead of the drive lobe by sweeping the exhaust out of the camming chamber 163 out through an exhaust port in the upper chamber half 134.

To increase the efficiency of the above described embodiment of the rotary engine 100, the drive disc 146 would port the compressed air/fuel mixture from the outer end of the camming chamber 162 in the lower chamber half 132 to the inner end of the spiraling camming chamber 163 in the upper chamber half 134. Thus, when the mixture is ignited in the upper chamber half 134, the moment arm applied to the drive shaft 140 increases due to the increasing axial distance from the drive shaft as the ignited mixture travels through the outwardly spiraling camming chamber 163. Earlier rotary engines, such as described in the McCann patent, cannot gain this efficiency because the force in these engines maintains a constant axial distance from the drive shaft.

The previously described embodiment of the rotary engine 100 is called "top-hot" because all of the ignition/exhaust portions occur in the upper chamber half 134. Another embodiment of the rotary engine 100 is a "floating ignition" or "sequenced ignition." Here, the intake/exhaust and ignition /compression portions of the combustion cycle take place in the camming chambers 162 and 163 of both the upper and lower chamber halves 132, 134.

In the "sequenced ignition" embodiment, drive lobes sweeping into the camming chambers 162, 163 intake the air/fuel mixture into both the upper and lower chamber halves 132, 134. Then, another drive lobe enters the chamber filled with air/fuel mixture. This lobe is propelled forward by a combustion event directly behind it and within the same chamber. The air/fuel mixture ahead of the drive lobe is compressed for delivery to another chamber. This utilizes the power stroke much better for the work required for compression and also contributes to a lower pressure seal differential.

The compressed air/fuel mixture would then be ported through a valve to another chamber. The chamber receiving the compressed air/fuel mixture will repeat the combustion/compression process. That sequence may either proceed to an overlapping chamber on the same side of the drive disc 146 or to a chamber on the other side of the drive disc 146.

To balance the forces and heat application in the "sequenced ignition" embodiment, the lower and upper chamber halves 132, 134 would preferably alternate the portions of the combustion cycle as the drive disc 146 spins around the drive shaft 140. For example, at a given point in time the upper chamber half 134 would have a drive lobe which had just completed a power stroke that would next enter another cooler chamber to perform an intake/exhaust function. This alternating cycle works out for any even number of drive plates.

As in the previous embodiment, the ignition device could be located either in the drive disc 146 or within the chamber halves 132, 134. A single ignition device could be located in the drive disc 146 with the ignition device being controlled to fire on one side or another of the drive disc 146 at the appropriately sequenced times.

Figure 11:
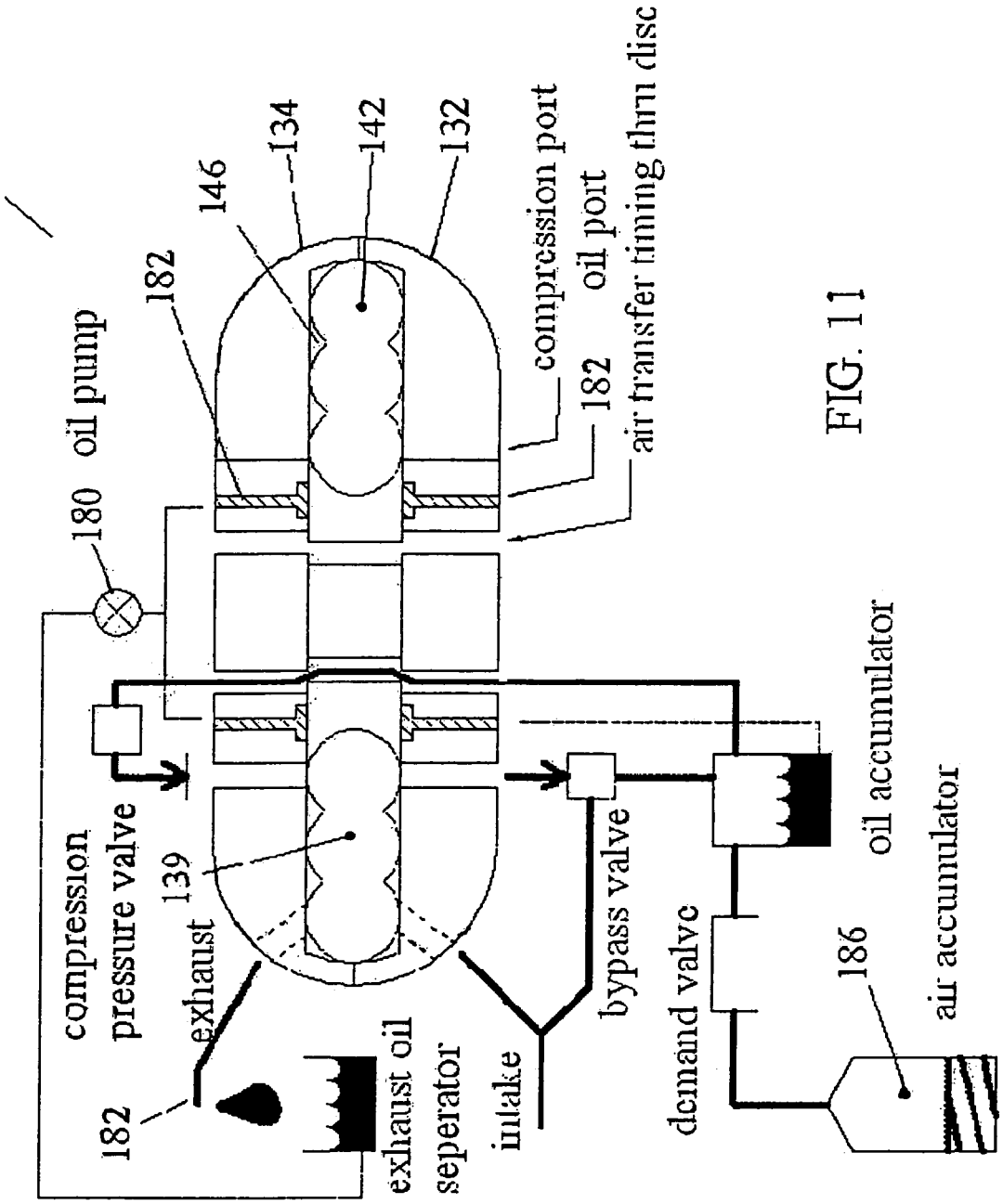
FIG. 11 is a schematic diagram of the rotary internal combustion engine of FIG. 10.

FIG. 11 is a schematic diagram of the rotary internal combustion engine 100 of FIG. 10 showing further details of the rotary engine embodiments. The oil pump 180 is arranged to provide pressurized oil to the rotary engine 100. The pressurized oil is ported into the engine 100 through oil ports 182 to intersperse the pressurized oil between the drive disc 146, chamber halves 132 and 134, and drive plates 139 and 142. The pressurized oil provides a hydrodynamic seal between the drive disc 146 and the camming chambers 162, 163(and the chamber halves 132, 134). The pressurized oil is scavenged ahead of the drive lobes performing the intake and combustion portions of the cycle and is forced out of oil exhaust port 184. The exhausted oil is then recycled back into the oil pump 180 for repeated use.

Regenerative braking done pneumatically can be performed by the rotary engine 100 with an air accumulator 186 that stores energy from deceleration.

An advantage of the rotary engine 100 is that the moving parts of the engine 100 do not undergo a reversal of motion through the combustion cycle like the constant reversal of pistons in a conventional engine. Here, the drive disc 146 and drive plates 139 and 142 follow a continuous motion in a single direction. This allows for structural designs that only have to account for the single direction and allow for seal designs that only have to account for the unidirectional motion of the moving parts and fluids.

Figure 12:
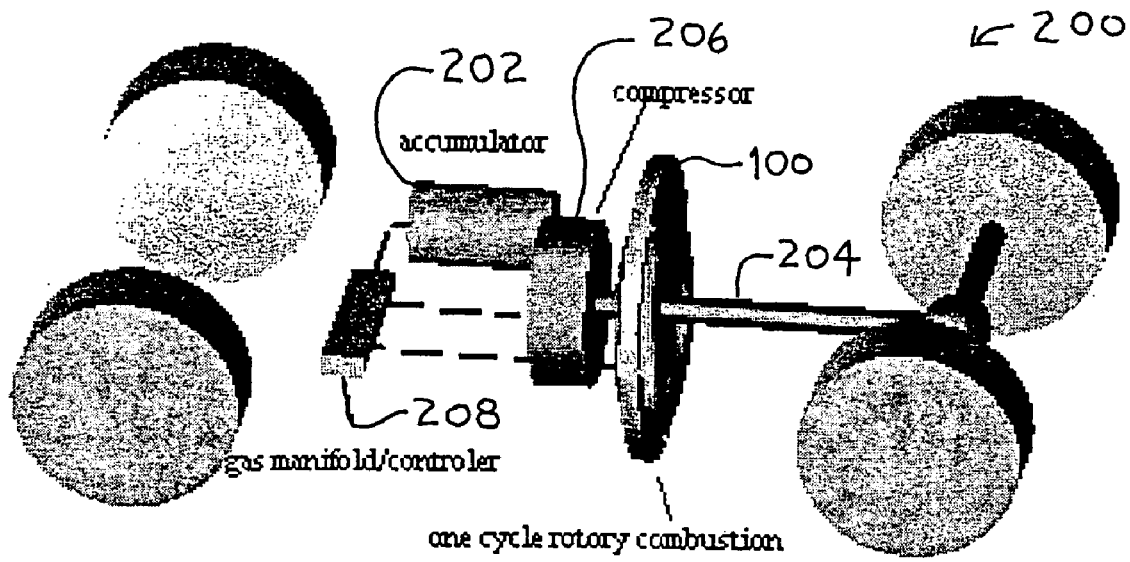
FIG. 12 is a perspective schematic view of a mechanical drive with regenerative gas accumulator utilizing a positive displacement rotary device according to another embodiment of the invention.

FIG. 12 is a perspective schematic view of an application of the rotary engine 100 showing mechanical drive system 200 with regenerative gas accumulator 202 according to another embodiment of the invention. The mechanical drive system 200 uses conventional vehicle drive train 204. A separate compressor 206 recovers energy from deceleration. Pressure is accumulated in the accumulator 202 and distributed back to the compressor 206 at a later time. The compressor 206 also feeds the combustion section of the rotary engine 100 as needed via the gas manifold/controller 208. If power is needed, fuel and ignition are provided and torque is applied to the drive train 204 and compressor 206.

Figure 13:
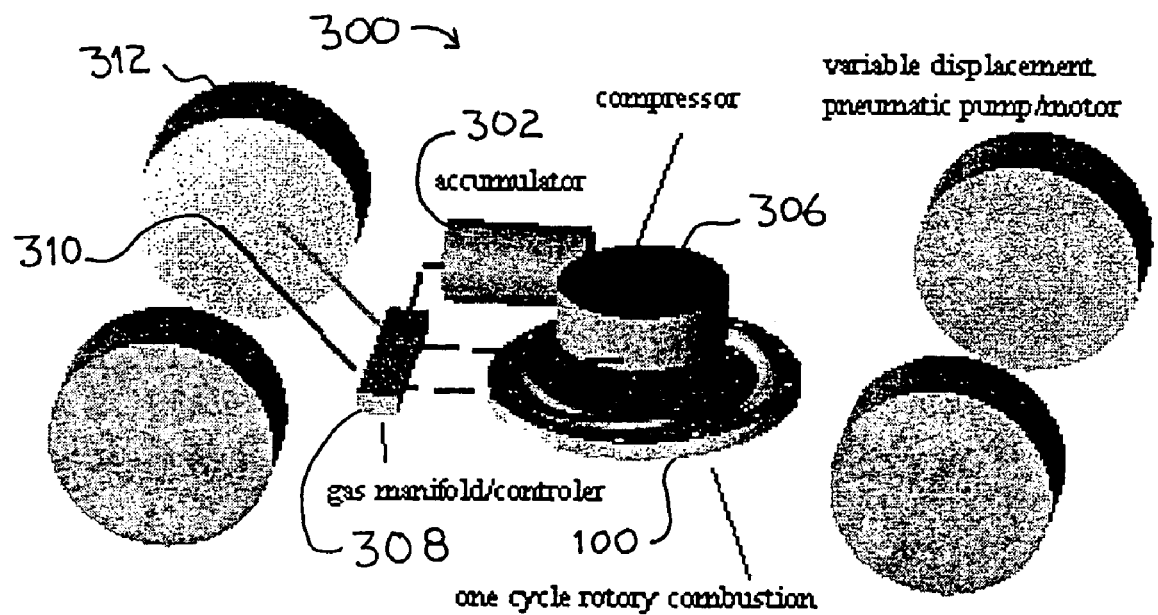
FIG. 13 is a perspective schematic view of a pneumatic drive with regenerative gas accumulator utilizing a positive displacement rotary device according to another embodiment of the invention.

FIG. 13 is a perspective schematic view of another application of the rotary engine 100 showing a pneumatic drive system 300 with a regenerative gas accumulator 302 according to another embodiment of the invention. System 300 removes the conventional power train and replaces it with variable displacement nutating pneumatic motors/pumps 310 that drive each wheel 312 independently. The combustion section 100 drives a compressor 306 via a common shaft when the pressure is low. The self-starting combustion section 100 runs intermittently as demands are made by sensors (not shown).

System 300 allows for use of a flat profile drive frame such as those being pursued by the major automobile manufacturers. Elimination of the conventional drive train, clutch, and transmission are also advantageous.

Figure 14:
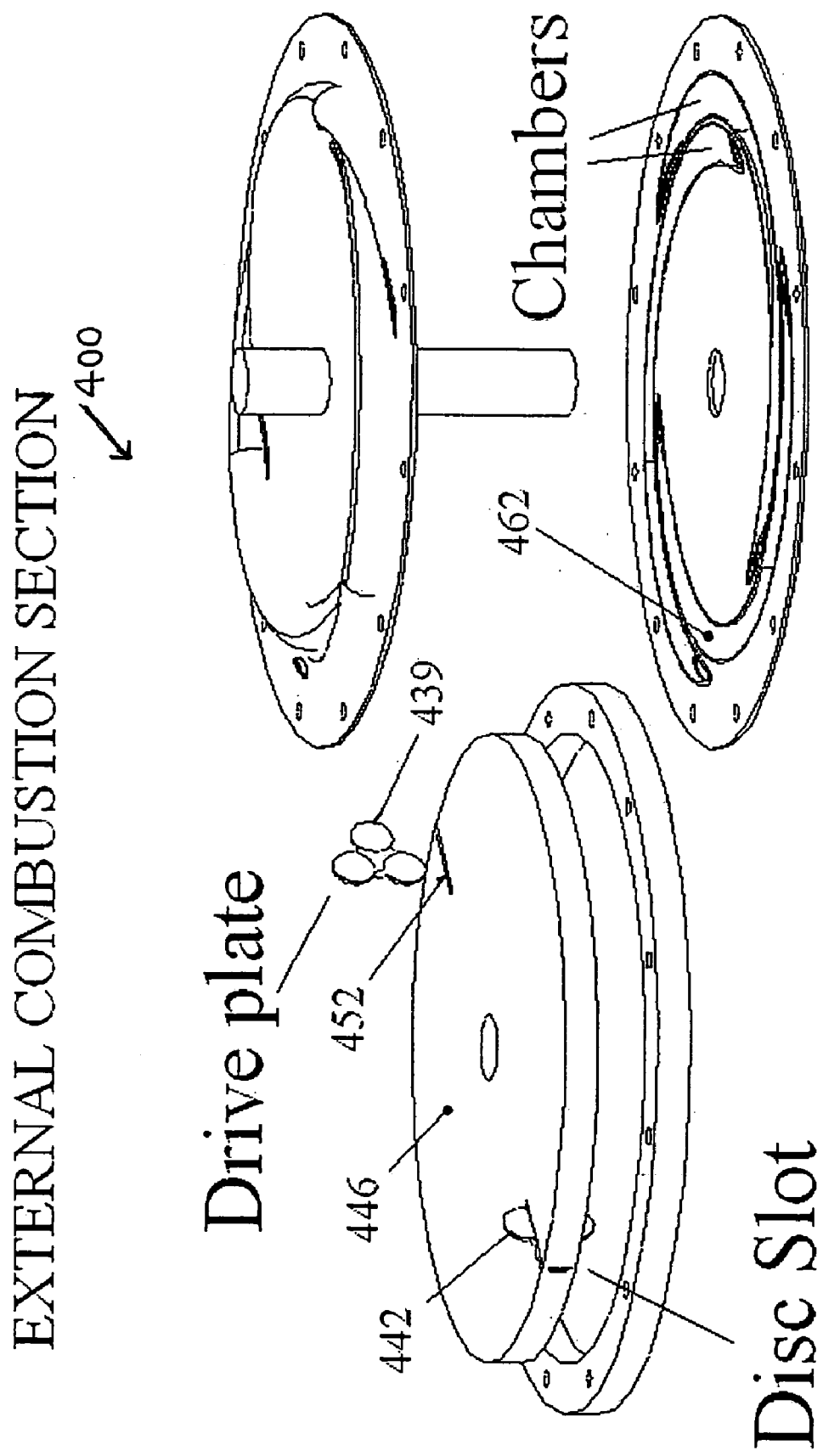
FIG. 14 is an exploded perspective view of a positive displacement external combustion engine according to another embodiment of the invention.

FIG. 14 is an exploded perspective view of a positive displacement external combustion engine 400 according to another embodiment of the invention. A six-chambered combustion section may be made from a pair of hot-forged plates and a single tooling die. Each three-lobed drive plate 439 and 442 sweeps exhaust out of a chamber 462 ahead of the drive lobe. Behind the drive plate lobe, externally combusted gas drives the lobe for a 180° power stroke in each chamber 462. Six power strokes occur for each rotation of the drive shaft 440.

Each of the six chambers 462 has a beginning and an end as the drive plate lobe emerges and disappears from the disc slot 454 in drive disc 446. The chambers 462 overlap both in rotation as seen in pairs above and below the drive disc 446. In total there are six power strokes of 180° duration.

It is expected that the rotary engine 400 would produce a sound similar to the rumble of a conventional V-12 engine.

Figure 15:
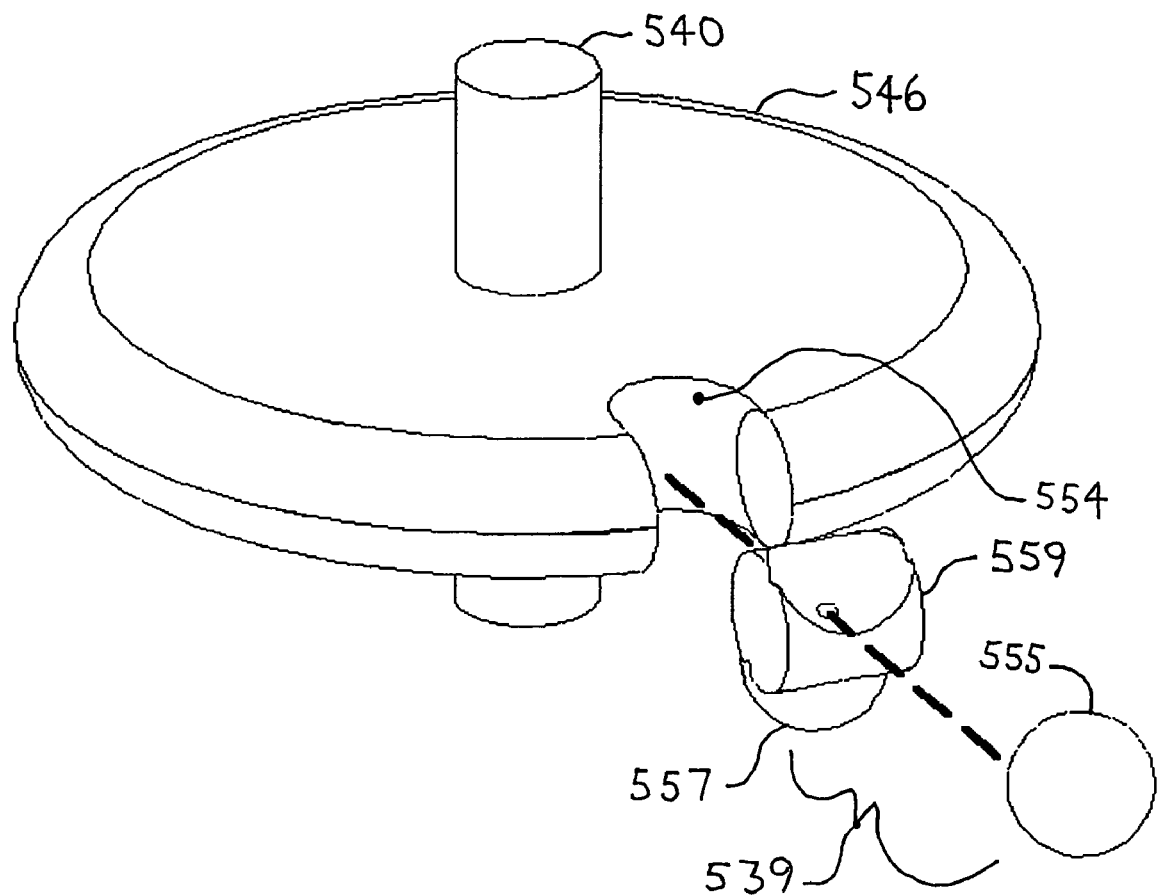
FIG. 15 is a perspective view of a rotary device according to another embodiment of the invention.

FIG. 15 is a perspective view of a drive disc 546 mounted on drive shaft 540 for use in a pneumatic rotary device according to another embodiment of the invention. In the pneumatic embodiment of the rotary device, it is desirable to have low drag or friction to overcome. Thus, along the chamber wall (not shown) which seals to the drive disc 546, a molded or cut in lip seal would only bear on the disc as the pressure builds up and have a better performance due to lowered friction.

Additionally, if the drive plate is replaced with a set of ball bearings 539, part of the sliding seal friction is removed by a harmonious rotation of the balls 555, 557. In order to eliminate leakage and keep the balls 555, and 557 aligned, a cylindrical cage 559 with sockets rotates around its own axis of rotation, same as the drive plates described above, within the axial slot 554.

The preceding embodiments are exemplary. Those of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of conveying fluid through a positive displacement rotary device, comprising:
    rotating a drive disc on a drive shaft around a drive shaft axis of rotation, the drive disc positioned between coupled first and second chamber halves;
    rotating at least one drive plate around a drive plate axis of rotation that is ninety degrees and tangent to the drive shaft axis of rotation, the drive plate including at least two drive lobes and the drive plate rotatably engaged to the drive disc with the drive plate axis of rotation located between the drive lobes;
    sweeping the drive lobes through camming chambers in the first and second chamber halves, each camming chamber in fluid communication with an inlet/outlet port in the chamber half, and the camming chambers shaped to follow the path of the drive lobes as the drive disc rotates on the drive shaft axis of rotation and the at least one drive plate rotates on the drive plate axis of rotation.

2. The method of claim 1, in which rotating the at least one drive plate includes rotating the at least one drive plate around the drive plate axis of rotation once when rotating the drive disc around the drive shaft axis of rotation once.

3. The method of claim 1, in which rotating the at least one drive plate includes rotating the at least one drive plate around the drive plate axis of rotation by two or more rotations when rotating the drive disc around the drive shaft axis of rotation once.

4. The method of claim 1, further including:
    intaking a mixture of air and fuel into a camming chamber;
    compressing a mixture of air and fuel in a camming chamber by sweeping a drive lobe through the camming chamber;

igniting the compressed mixture of air and fuel;

exhausting the ignited mixture of air and fuel from a camming chamber by sweeping a drive lobe through the camming chamber.

5. The method of claim 4, further including hydrodynamically sealing the drive disc, drive plate, camming chambers and chamber halves by interspersing pressurized oil amongst the same.

6. The method of claim 1, in which rotating the at least one drive plate includes rotating the at least one drive plate around the drive plate axis of rotation once when rotating the drive disc around the drive shaft axis of rotation twice.

7. A positive displacement rotary device, comprising:

first and second chamber halves coupled together, each chamber half having a chamber face;

a drive shaft extending through the chamber halves with a longitudinal axis of rotation;

a drive disc rotatably coupled to the drive shaft and positioned between the chamber faces of the chamber halves, the drive disc including at least one axial slot; and at least one drive plate rotatably engaged in the at least one axial slot in the drive disc so that the drive plate rotates around a drive plate axis of rotation ninety degrees and tangent to the drive shaft axis of rotation, the drive plate having at least two drive lobes and the axis of rotation of the drive plate located between the at least two drive lobes, where the chamber face of each chamber half includes a camming chamber defined by a path of the drive lobes as the drive plate rotates around the drive plate axis of rotation and rotates around the drive shaft axis of rotation and the chamber face of each chamber half forms a seal against the drive disc.

8. The device of claim 7, in which the first and second chamber halves each include an inlet/outlet port connecting an external surface of the chamber half with the camming chamber.

9. The device of claim 8, further comprising at least another pair of chamber halves coupled together and arranged to be in fluid communication with the first and second chamber halves, the drive shaft extending through the at least another pair of chamber halves;

a drive disc mounted on the drive shaft between the at least another pair of chamber halves, the drive disc having at least one axial slot; and at least one drive plate rotatably engaged in the at least one axial slot in the drive disc so that the drive plate rotates around a drive plate axis of rotation ninety degrees and tangent to the drive shaft axis of rotation, the drive plate having at least two drive lobes and the axis of rotation of the drive plate located between the at least two drive lobes, where the at least another pair of chamber halves include camming chambers similar to the camming chambers of the first and second chamber halves.

10. The device of claim 7, in which the at least one axial slot in the drive disc includes two axial slots and the at least one drive plate includes two drive plates.

11. The device of claim 7, in which the at least two drive lobes are substantially circular drive lobes.

12. The device of claim 7, further including a seal formed around an edge of the at least one drive plate.

13. The device of claim 7, in which the drive plate completes a single rotation about the drive plate axis of rotation when the drive disc completes a single rotation around the drive shaft axis of rotation.

14. The device of claim 7, in which the drive plate completes two or more rotations about the drive plate axis of rotation when the drive disc completes one rotation around the drive shaft axis of rotation.

15. The device of claim 7, in which the camming chamber of the first chamber half is arranged to perform an intake and a compression portion of a combustion cycle and the camming chamber of the second chamber half is arranged to perform an ignition and an exhaust portion of the four-stroke combustion cycle.

16. The device of claim 15, further including pressurized oil interspersed between the camming chambers, chamber halves, drive disc and drive plate, the pressurized oil maintaining a hydrodynamic seal within the device.

17. The device of claim 7, in which the device includes at least two drive plates;

each camming chamber is arranged to perform an intake and an exhaust portion of a combustion cycle on either side of a drive lobe of a first drive plate; and each camming chamber is arranged to perform an ignition and a compression portion of a four-stroke combustion cycle on either side of a drive lobe of a next drive plate.

18. The device of claim 17, further including pressurized oil interspersed between the camming chambers, chamber halves, drive disc and drive plate, the pressurized oil maintaining a hydrodynamic seal within the device.

19. The device of claim 7, in which the drive plate completes one rotation about the drive plate axis of rotation when the drive disc completes two rotations around the drive shaft axis of rotation.

* * * * *

UNITED STATES PATENT AND TRADEMARK OFFICE
CERTIFICATE OF CORRECTION

PATENT NO. : 7,171,941 B2 Page 1 of 1
APPLICATION NO. : 11/048361
DATED : February 6, 2007
INVENTOR(S) : Steve Johnson It is certified that error appears in the above-identified patent and that said Letters Patent is hereby corrected as shown below:

On the Title page, under Related U.S. Application Data, it should read --Provisional application No. 60/540,642, filed on Jan. 30, 2004.--.

Signed and Sealed this

Fifteenth Day of April, 2008

JON W. DUDAS
*Director of the United States Patent and Trademark Office*